US010743385B2

(12) United States Patent
Safaee

(10) Patent No.: US 10,743,385 B2
(45) Date of Patent: Aug. 11, 2020

(54) ADJUSTABLE VOLTAGE CONSTANT CURRENT LIGHT EMITTING DIODE (LED) DRIVER FOR AUTOMOTIVE HEADLIGHTS

(71) Applicant: Osram Sylvania Inc., Wilmington, MA (US)

(72) Inventor: Alireza Safaee, Danvers, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 16/486,532

(22) PCT Filed: Feb. 27, 2017

(86) PCT No.: PCT/US2017/019629
§ 371 (c)(1),
(2) Date: Aug. 16, 2019

(87) PCT Pub. No.: WO2018/156162
PCT Pub. Date: Aug. 30, 2018

(65) Prior Publication Data
US 2020/0008276 A1    Jan. 2, 2020

(51) Int. Cl.
H05B 45/48       (2020.01)
H05B 45/37       (2020.01)
B60Q 1/14        (2006.01)

(52) U.S. Cl.
CPC ............. H05B 45/48 (2020.01); H05B 45/37 (2020.01); B60Q 1/1407 (2013.01)

(58) Field of Classification Search
None
See application file for complete search history.

(56) References Cited

U.S. PATENT DOCUMENTS

| | | | |
|---|---|---|---|
| 6,462,962 B1* | 10/2002 | Cuk | H02M 1/34 363/131 |
| 2011/0204797 A1 | 8/2011 | Lin et al. | |
| 2013/0271500 A1* | 10/2013 | Guo | H05B 33/0815 345/690 |
| 2014/0292201 A1 | 10/2014 | Logiudice | |
| 2016/0353531 A1 | 12/2016 | Conner et al. | |

OTHER PUBLICATIONS

Erskine, Andrew, International Search Report and Written Opinion of the International Searching Authority, for counterpart application PCT/US2017/019629, dated Oct. 24, 2017, European Patent Office, Rijswijk, The Netherlands, 16 pages.

* cited by examiner

*Primary Examiner* — Jany Richardson
(74) *Attorney, Agent, or Firm* — Yutian Ling

(57) ABSTRACT

Various embodiments include a voltage adjusting block (VAB) coupled to a light emitting diode (LED) string. The VAB includes a first switch having a first lead connected to a voltage input, and having a second lead, the first switch having a controllable duty cycle, a first diode having a cathode connected to the second lead of the first switch, and having an anode, a first inductor having a first lead connected to the cathode of the first diode, and having a second lead, and a first capacitor having a first lead connected to the anode of the first diode and having a second lead connected to the second lead of the first inductor. The VAB may provide a variable voltage across the anode of the first diode and the second lead of the first capacitor dependent upon a number of LEDs in the LED string being turned on.

18 Claims, 10 Drawing Sheets

ADJUSTABLE VOLTAGE CONSTANT CURRENT LIGHT EMITTING DIODE (LED) DRIVER FOR AUTOMOTIVE HEADLIGHTS

CROSS-REFERENCE TO RELATED APPLICATIONS

The present application is a National Stage application of, and claims the benefit of priority of, International Application No. PCT/US2017/019629, filed Feb. 27, 2017, the entire contents of which are hereby incorporated by reference.

BACKGROUND

The use of light emitting diodes (LEDs) for automotive vehicles have become increasingly popular. LEDs are electronic devices that emit light when activated with an appropriate current as a result of electrons recombining with electron holes within the device, releasing energy partially in the form of photons. LEDs offer many advantages over conventional automotive light sources including lower energy consumption, longer lifetime, improved physical robustness, and smaller size.

Circuits incorporating a diode, an inductor and a switch can be arranged to provide a buck circuit, a boost circuit, or a buck-boost circuit. In a buck circuit (also referred to as a step down circuit) the input voltage is greater than the output voltage, and both are greater than zero. In a boost circuit (also referred to as a step up circuit) the output voltage is greater than the input voltage, and both are greater than zero. In a buck-boost circuit (also referred to as a step up and step down circuit) the input and output have opposite polarities and the absolute value of the output voltage can be greater or smaller than the absolute value of the input voltage.

Advanced Steerable Beam (ADB) automotive headlights are able to direct the light beam to a desired direction with a specified intensity. These systems usually incorporate many LEDs with the possibility of Pulse Width Modulation (PWM) dimming for each individual LED. PWM dimming changes the LED light output by varying the duty cycle of a constant current in the string to effectively change the average current in the string. In typical ADB front headlight systems for vehicles there are several LEDs connected in series, referred to herein as a LED string, which is driven by a constant current driver. Each individual LED is dimmed via a dedicated bypass switch using a PWM method. The constant current driver is capable of operating with a wide Direct Current (DC) input voltage range with adaptive selection of the mode. The mode selection criterion keeps the voltage across the current source stage constant to increase its efficiency. This method of operation maximizes the efficiency of the whole system based on the existing conditions, i.e. the number of active LEDs in the string and the input DC voltage. Due to the ability to select the optimum voltage in all conditions, the system can operate efficiently at high frequency (for example 100 kilohertz (kHz)<f<800 kHz) and be compact i.e. a high power density.

Typically, the LEDs are connected in series as a string. In parallel to each individual LED there is a dedicated bypass switch controlled by the LED string controller block (also known as a matrix manager). If the switch is open, the current flows through the LED and it emits light, and when the switch is closed, the voltage across the LED is less than its operational threshold so the LED is turned off. By selecting the relative duration of on and off intervals, the average brightness of each LED can be individually controlled.

A common method of implementing a current source block is to use a step-down topology and use feedback to make the output current constant. In one conventional technique, a current source circuit based on a buck topology includes a controller circuit that monitors the current passing the switch and selects the proper frequency and duty cycle to regulate the LED string current.

SUMMARY

Conventional mechanisms such as those explained above suffer from a variety of deficiencies. One such deficiency is that the voltage across the LEDs can reach about 40 Volts (V) when 12 LEDs in a string are on and buck topology requires its input voltage to be higher than its output voltage. Therefore the buck converter is designed for an input voltage higher than 40V, often times designed for a 48V input. If the input DC voltage drops below the regulated LED string voltage, the converter goes into dropout mode and keeps the transistor turned fully on to have the input voltage delivered to the output, which results in a non-constant current source.

To provide a LED driving current from a battery voltage that is lower than the full LED string voltage, one approach is to use a dual stage arrangement. The first stage is a step-up constant output voltage converter in order to boost the battery voltage and stabilize it against variations of battery voltage and output power at a level higher than the full LED string voltage, e.g. about 48-50 V. The second stage is a step-down constant output current circuit. This conventional design has deficiencies. First, the constant voltage block increases the voltage to a fixed level regardless of the momentary voltage to power the LED string. During moments when the number of active LEDs is low, the process of increasing the voltage to about 50V and then reducing it lower for the current source stage generates unnecessary losses and reduces efficiency. Second, the constant current block usually works using a reliable hysteretic cycle-by-cycle current controller which may keep the current transient free (at the LED in and out moments) and may counteract the tolerances in the components. The hysteresis controller is stable and reliable but generates variable frequency switching. In the cases of few active LEDs, the large voltage difference between the input and output of the current source results in high current differential (di/dt) so the switching frequency becomes extremely large. Wide variation of the switching frequency comes with severe electromagnetic interference (EMI) issues, interference with the control loop of the constant voltage block, increased size of EMI filter, and switching losses. Note that the step-down constant current circuits typically operate under hard switching and the switching loss increases linearly with the switching frequency.

Various embodiments disclosed herein include an adjustable voltage block for a constant current LED driver for automotive headlights to overcome such deficiencies. In one embodiment a constant output current LED driver circuit arrangement and its control are presented, with the capability to adjust the voltage across the current source to enhance its efficiency while working with a wide range of output DC voltages. The present disclosure introduces a dual stage DC-DC constant output current LED driver for ADB front headlight systems.

The presently disclosed adjustable voltage constant current LED driver for automotive headlights provides several benefits. These benefits include higher overall efficiency over wide battery and output voltage ranges, reduction of switching frequency variation (in the constant current stage) due to adaptive generation of voltage across the current source stage, smaller size and lower cost for passive components, lower harmonic content in the currents and smaller EMI filter components, wider range of off-the-shelf options for the switches, reduced current in step-up operation, and higher reliability due to lower voltage and current stress in the components.

Various embodiments may include a circuit that includes voltage adjusting block (VAB) coupled to a light emitting diode (LED) string. The VAB may include a first switch having a first lead connected to a voltage input, and having a second lead, the first switch having a controllable duty cycle, a first diode having a cathode connected to the second lead of the first switch, and having an anode, a first inductor having a first lead connected to the cathode of the first diode, and having a second lead, and a first capacitor having a first lead connected to the anode of the first diode and having a second lead connected to the second lead of the first inductor. The VAB may provide a variable voltage across the anode of the first diode and the second lead of the first capacitor dependent upon a number of LEDs in the LED string being turned on.

Various other embodiments may include a circuit that includes a voltage adjusting block (VAB) coupled to a light emitting diode (LED) string. The VAB may include a first switch having a first lead and a second lead, the first switch having a controllable duty cycle, a first diode having a cathode, and having an anode connected to the first lead of first switch, a first inductor having a first lead connected to the anode of the first diode, and having a second lead connected to an input voltage, and a first capacitor having a first lead connected to the cathode of the first diode and having a second lead connected to the second lead of the first switch. The VAB may provide a variable voltage across the first capacitor dependent upon a number of LEDs in the LED string being turned on.

Note that each of the different features, techniques, configurations, etc. discussed in this disclosure can be executed independently or in combination. Accordingly, the various embodiments can be embodied and viewed in many different ways. Also, note that this summary section herein does not specify every embodiment and/or incrementally novel aspect of the present disclosure. Instead, this summary provides a preliminary discussion of different embodiments and corresponding points of novelty over conventional techniques. For additional details, elements, and/or possible perspectives (permutations) of the various embodiments, the reader is directed to the Detailed Description section and corresponding figures of the present disclosure as further discussed below.

BRIEF DESCRIPTION OF THE DRAWINGS

The foregoing will be apparent from the following more particular description of various embodiments, as illustrated in the accompanying drawings in which like reference characters refer to the same parts throughout the different views. The drawings are not necessarily to scale, emphasis instead being placed upon illustrating the principles of the various embodiments. The drawings are not necessarily to scale, emphasis instead being placed upon illustrating the principles of the various embodiments.

DETAILED DESCRIPTION

Figure 1:
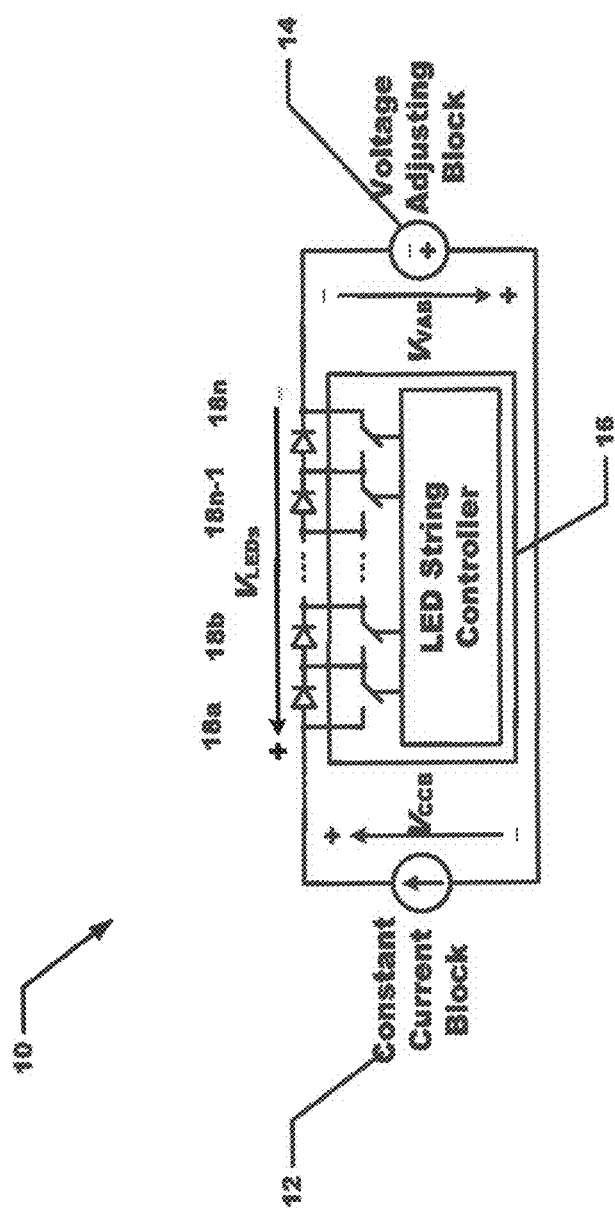
FIG. 1 depicts a high level block diagram of an adjustable voltage constant current LED driver circuit in accordance with various embodiments.

The embodiments set forth below represent information to enable those skilled in the art to practice the various embodiments and illustrate the various modes of practicing the embodiments. Upon reading the following description in light of the accompanying figures, those skilled in the art will understand the concepts of the various embodiments and recognize applications of these concepts not particularly addressed herein. It should be understood that these concepts and applications fall within the scope of the disclosure and the accompanying claims.

The various embodiments are described with reference to the accompanying drawings. The various embodiments may, however, be embodied in many different forms and should not be construed as limited to the embodiments set forth herein; rather, the embodiments are provided so that this disclosure will be thorough and complete, and will fully convey the scope of the various embodiments to those skilled in the art. The terminology used in the detailed description of the particular embodiment illustrated in the accompanying drawings is not intended to be limiting of all embodiments. In the drawings, like numbers refer to like elements.

In automotive applications the battery voltage available for headlights can vary greatly. For example, with a nominal 12V battery system the headlights operate with no derating for the DC voltages from 8 volts to 18 volts and with derating down to 6 volts or up to 28 volts. There is a need for LED based automotive headlights with many individually-dimmable LEDs fed by compact and reliable drivers. The concept of the string of LEDs with PWM dimming per LED is a major solution for such applications. Increasing the overall efficiency makes a major difference in the size, cost and reliability of the headlight.

The LED driver of the present disclosure has the same structure of a dual stage converter. The present adjustable voltage constant current LED driver for automotive headlights includes adaptive control of the voltage level at the interface of the constant voltage block and the constant current block in order to improve efficiency. The details of the various embodiments are explained below.

Referring now to FIGS. 1-4, a high level schematic diagram of a first particular embodiment of the adjustable voltage constant current LED driver for automotive headlights 10 is shown. The circuit 10 includes a constant current block (CCB) 12 in electrical communication with LEDs 18a-18n. The LEDs 18a-18n are in communication with an LED string controller 16. The circuit 10 also includes a voltage adjusting block (VAB) 14 in communication with the LED string.

Figure 2:
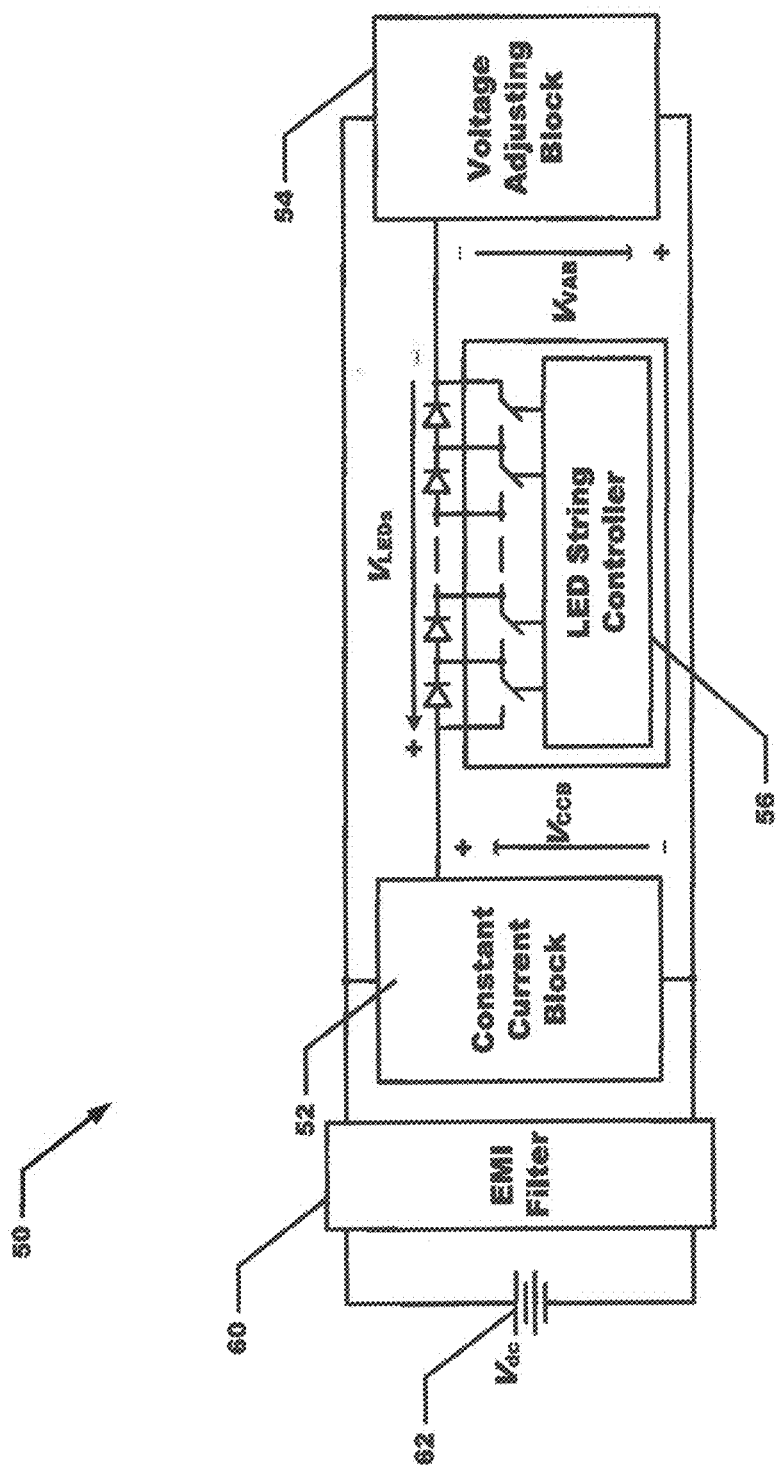
FIG. 2 depicts a block diagram of an adjustable voltage constant current LED driver circuit in accordance with various embodiments.

FIG. 2 shows a circuit 50 that includes more details of the converter blocks and their connections than as shown in circuit 10 of FIG. 1. Symbols $V_{dc}$, $V_{CCB}$, $V_{LEDs}$, and $V_{VAB}$ represent the voltages across the battery, CCB, LED string, and VAB, respectively. The EMI filter block 60 prohibits high frequency current components from entering the vehicle wiring which otherwise can cause interference with other electrical systems.

The voltages satisfy the following relation:

$$V_{CCB} = V_{dc} + V_{VAB} - V_{LEDs} \quad (1)$$

Note that the polarity of $V_{VAB}$ in FIG. 2 is selected such that $V_{VAB}$ has positive values (when there is a switching action in the VAB).

Figure 3:
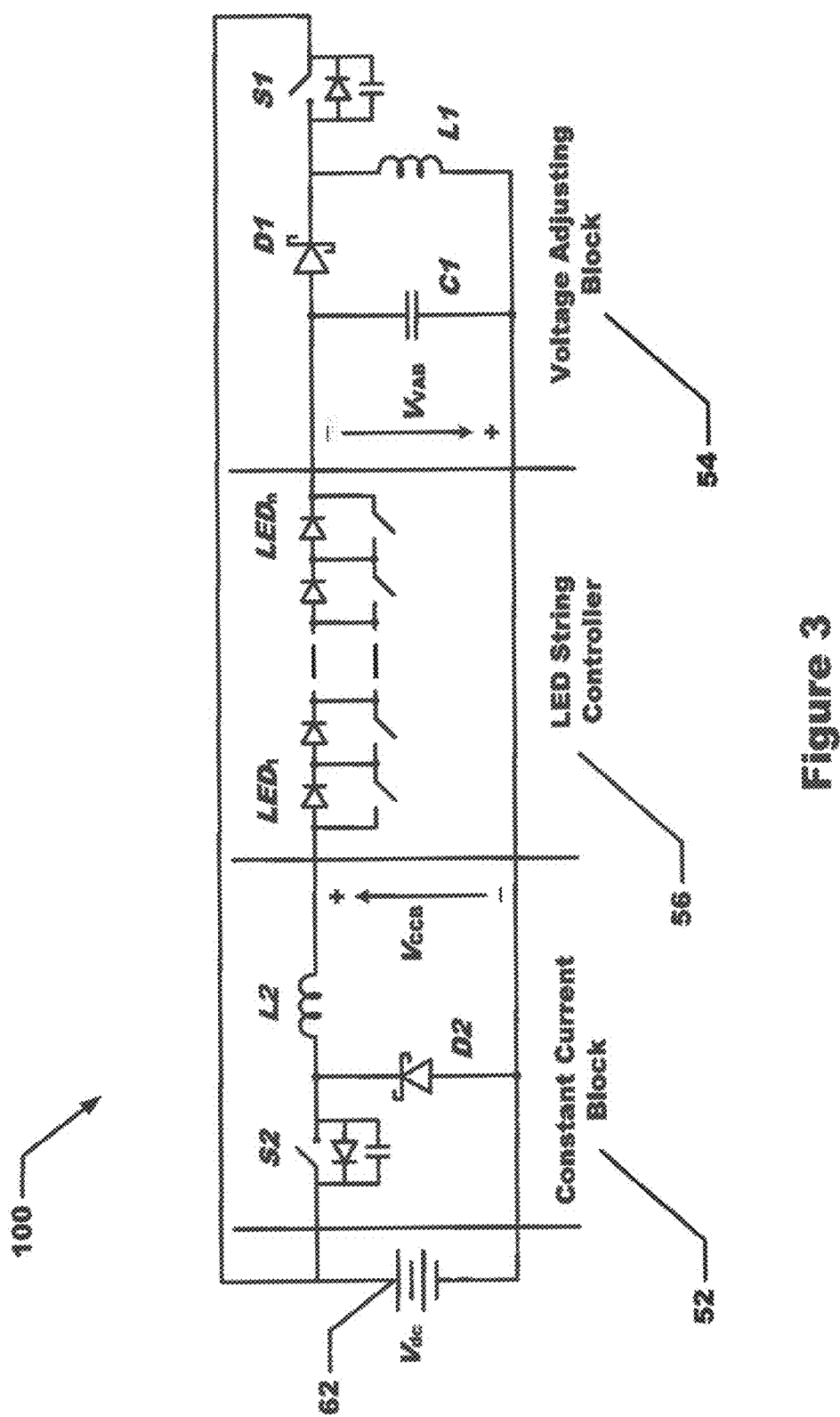
FIG. 3 depicts a block diagram of another view of the adjustable voltage constant current LED driver circuit in accordance with various embodiments.

The structure of the CCB 52 is a step-down buck topology providing a constant output current via cycle-by-cycle current control feedback that can be of a hysteresis type. The full schematic diagram of the circuit 50 is depicted in FIG. 3 in circuit 100. The EMI block is not shown for simplicity.

The purpose of the presently disclosed adjustable voltage constant current LED driver for automotive headlights is to increase the overall efficiency of the circuit by increasing the efficiency of the CCB 52. Due to the step-down structure of the CCB 52, when the condition of $$V_{CCB} \geq 4V \quad (2)$$

is satisfied the CCB 52 may operate as a current source. The controller circuit of the adjustable voltage constant current LED driver for automotive headlights adjusts the value of $V_{VAB}$ in order to keep $V_{CCB}$ approximately constant (e.g., close to 4V) in order to keep the efficiency of the CCB 52 high.

When the LED string has few active LEDs, i.e. when $V_{dc} - 4V > V_{LEDs}$, switch S2 remains off. Inductor L2 becomes short circuited and provides a path for the DC component of the LED current toward the ground level (negative of $V_{dc}$) via D2. This condition for circuit 100 is illustrated in circuit 150 of FIG. 4.

Figure 4:
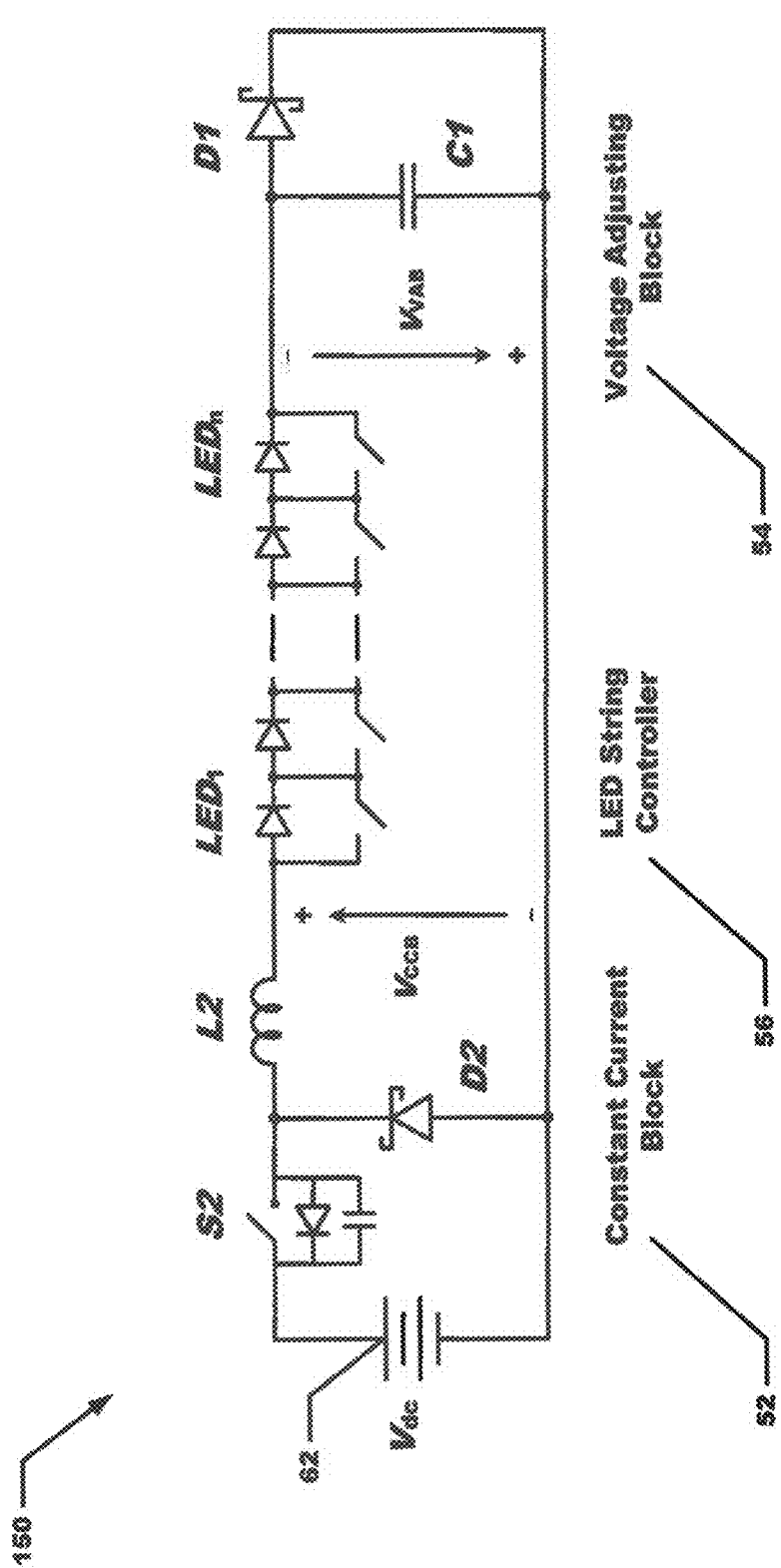
FIG. 4 depicts a block diagram of another view of the adjustable voltage constant current LED driver circuit in accordance with various embodiments.

Referring in particular to FIGS. 3 and 4, the Voltage Adjusting Block (VAB) 54 includes a first switch (S1) having a first lead connected to a voltage input, and having a second lead, the first switch having a controllable duty cycle. The VAB 54 also includes a first diode (D1) having a cathode connected to the second lead of the first switch, and having an anode. Additionally the VAB 54 includes a first inductor (L1) having a first lead connected to the cathode of the first diode D1, and having a second lead. The VAB 54 also includes a first capacitor (C1) having a first lead connected to the anode of the first diode D1 and having a second lead connected to the second lead of the first inductor L1. The VAB 54 provides a variable voltage dependent upon the number of LEDs being turned on.

The circuit further includes an LED string controller 56 having a plurality of outputs controlling operation of the LEDs by way of a plurality of switches. The LED string has a first input connected to the anode of the first diode D1 and a second input. The circuit additionally includes a constant current block (CCB) 52 having a first input, a second input connected to the second lead of the first capacitor C1, and having an output connected to the second input of the LED string controller 56. Also shown is a battery 62 having a first lead connected to the first input of the CCB 52 and to the first lead of the first switch S1, and a second lead connected to the second input of the CCB 52.

The circuit may also include an EMI filter 60 having a first connection to the first lead of the battery 62 and having a second connection to the second lead of the battery 62.

The duty cycle of the first switch S1 may be controlled using a first switch diode having a cathode connected to the first lead of the first switch S1 and having an anode connected to the second lead of the first switch S1, and a first switch capacitor having a first lead connected to the first lead of the first switch S1 and having a second lead connected to the second lead of the first switch S1.

The LED string in the LED string controller 56 includes a plurality of LEDs connected in series, in which an anode of the first LED of the plurality of LEDs is connected in series to an input of the LED string controller 56 and a cathode of a last LED of the plurality of LEDS is connected to another input of the LED string controller 56. The LED string controller 56 also includes a plurality of bypass switches, in which each LED of the plurality of LEDS has a single bypass switch connected across the LED. The LED string controller 56 also includes a plurality of outputs, in which each bypass switch of the plurality of bypass switches is controlled by an output of the plurality of outputs of the LED string controller 56.

The LED string controller 56 may include, for each bypass switch of the plurality of bypass switches, a switch diode having a cathode connected to the first lead of the bypass switch and having an anode connected to a second lead of the bypass switch. Each bypass switch may include a switch capacitor having a first lead connected to the first lead of the bypass switch and having a second lead connected to a second lead of the bypass switch.

The CCB 52 may include a second switch (S2) having a first lead connected to the first lead of the battery, and having a second lead. The CCB 52 may also include a second diode (D2) having a cathode connected to the second lead of the second switch S2, and having an anode connected to the second lead of the battery. Additionally, the CCB 52 may include a second inductor (L2) having a first lead connected to the cathode of the second diode D2, and having a second lead connected to second input of the LED string.

For the case of FIG. 4 the voltages are:

$$V_{VAB} \cong -V_{D2} \rightarrow V_{CCB} = V_{dc} - V_{D2} - V_{LEDs} \quad (3)$$

Thus the maximum value of $V_{CCB}$ can reach up to $V_{dc} - V_{D2}$ when all LEDs are bypassed.

As the number of active LEDs in the string increases the value of $V_{CCB}$ reduces, which also improves the efficiency of the CCB 52. However, as the number of active LEDs increases the value of $V_{LEDs}$ rises and the condition in equation 2 may be violated. In this situation, the VAB 54 starts operating as a standard buck-boost converter. The controller adjusts the value of $V_{VAB}$ such that $V_{CCB}$ is kept approximately constant (e.g., close to 4V). Switch S2 switches with a duty ratio $D_{S2}$ and therefore:

$$V_{VAB} \cong \frac{D_{S2}}{1-D_{S2}} V_{dc} \qquad (4)$$

As the number of active LEDs in the string changes the value of $V_{LEDs}$ varies. Thus the CCB 52 may adaptively readjust $V_{VAB}$ via altering the duty ratio $D_{S2}$ to keep $V_{CCB}$ approximately constant (e.g., close to 4V).

With this approach there is no need to boost the battery voltage up to 50V to cover the entire range of conditions of the LED string as the voltage source does not need to be higher than the largest LED string voltage. Capacitor C1 has a small value so the settling time of $V_{VAB}$ can be as short as 10 microseconds (μs). Another aspect of having $V_{CCB} \cong 4V$ is that the switching frequency of the CCB 52 has a narrower range of variation, which reduces the difficulty of EMI, stress on the gate drivers, and switching loss in S1.

It should be noted that there is no need to synchronize the two converters. The CCB 52 operates with variable frequency to act as a current source, while VAB 54 can be a constant frequency converter. With proper design it is possible to keep the two frequency ranges close and reduce the size of EMI filter 60.

Figure 5:
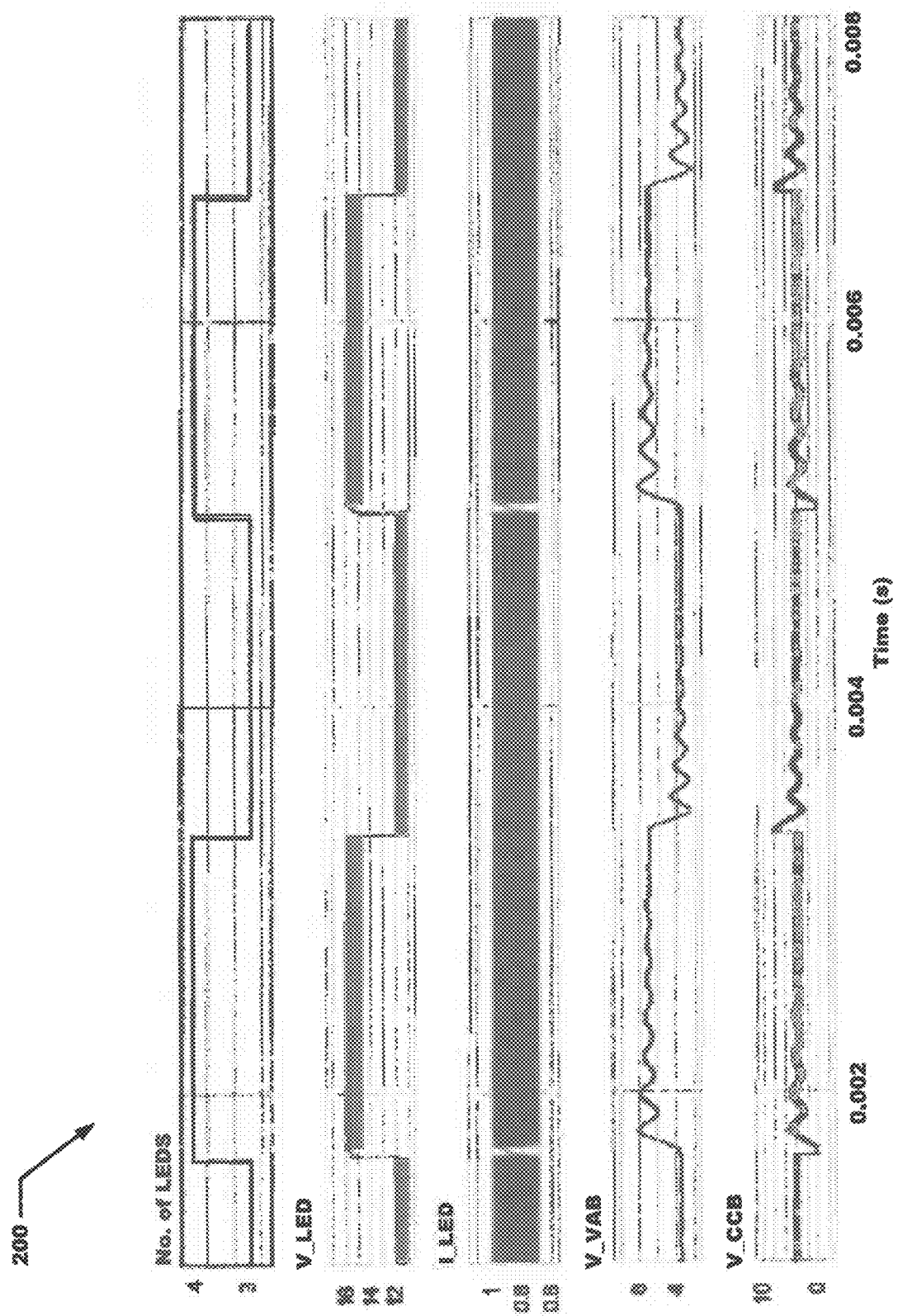
FIG. 5 depicts a graph showing various voltages and currents for the circuit of FIG. 4.

FIG. 5 shows the simulated main waveforms 200 for the converter $L_1 = L_2 = 33$ μH and C=10 μF at $V_{dc}=12V$. The CCB 52 operates using a hysteresis controller to keep the LED current between 0.7 and 1 A. The VAB 54 operates at 200 kHz and its duty cycle, DR, changes (in an open loop feedforward fashion) such that $V_{CCB}$ is maintained at approximately 4V for any number of active LEDs. With respect to FIG. 5, the LEDs have a threshold forward voltage of 3V and a dynamic resistance of 1Ω, and therefore $V_{LED}$ varies from 11.55V to 15.4V when the number of active LEDs changes from 3 to 4, respectively. Note that usually there is no need to consider the transitions with more than one LED because it is possible to select the transition times of the PWM dimming to limit the transitions to one LED at a time. Also note that there is no overshoot and undershoot in the LED currents and the LED voltage jumps to the needed value rapidly. The transients in the capacitor voltage are less than one volt, which may be acceptable.

Figure 6:
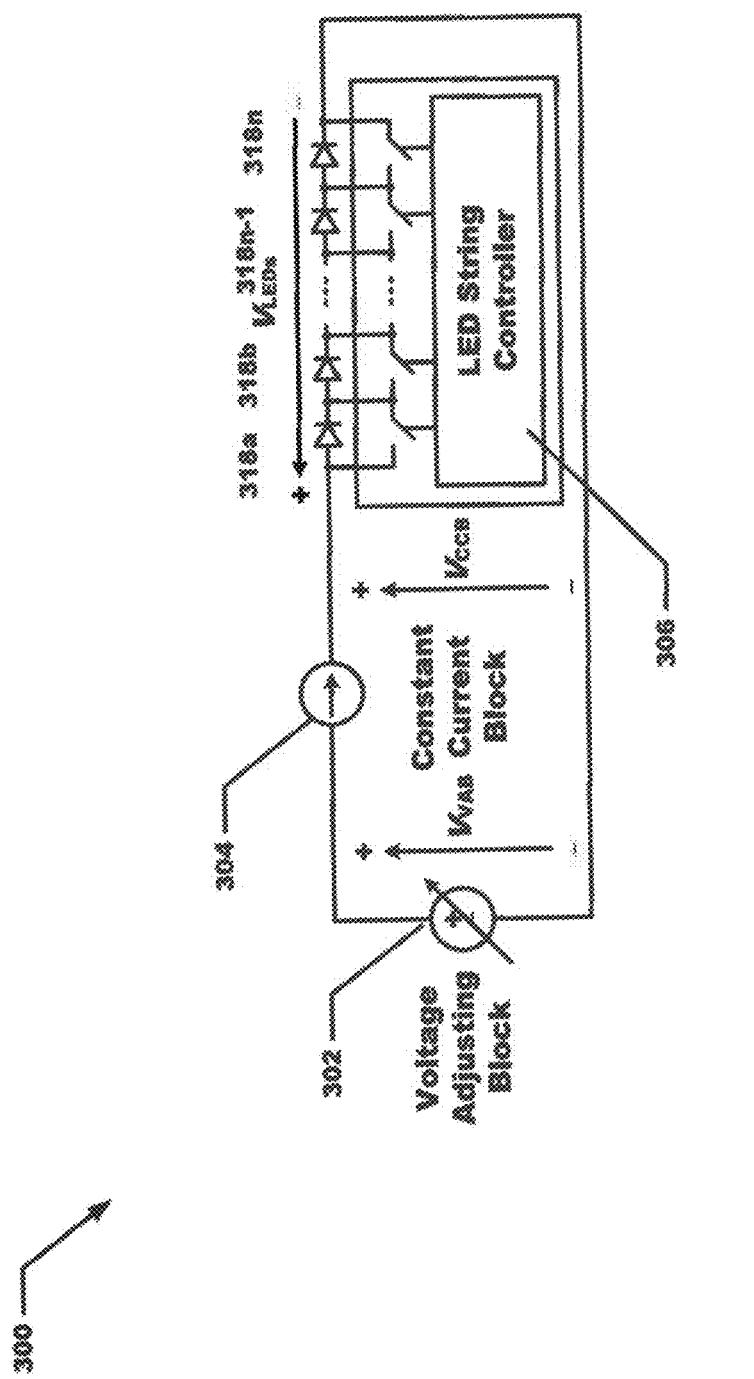
FIG. 6 depicts a high level block diagram of another adjustable voltage constant current LED driver circuit in accordance with various embodiments.
Figure 7:
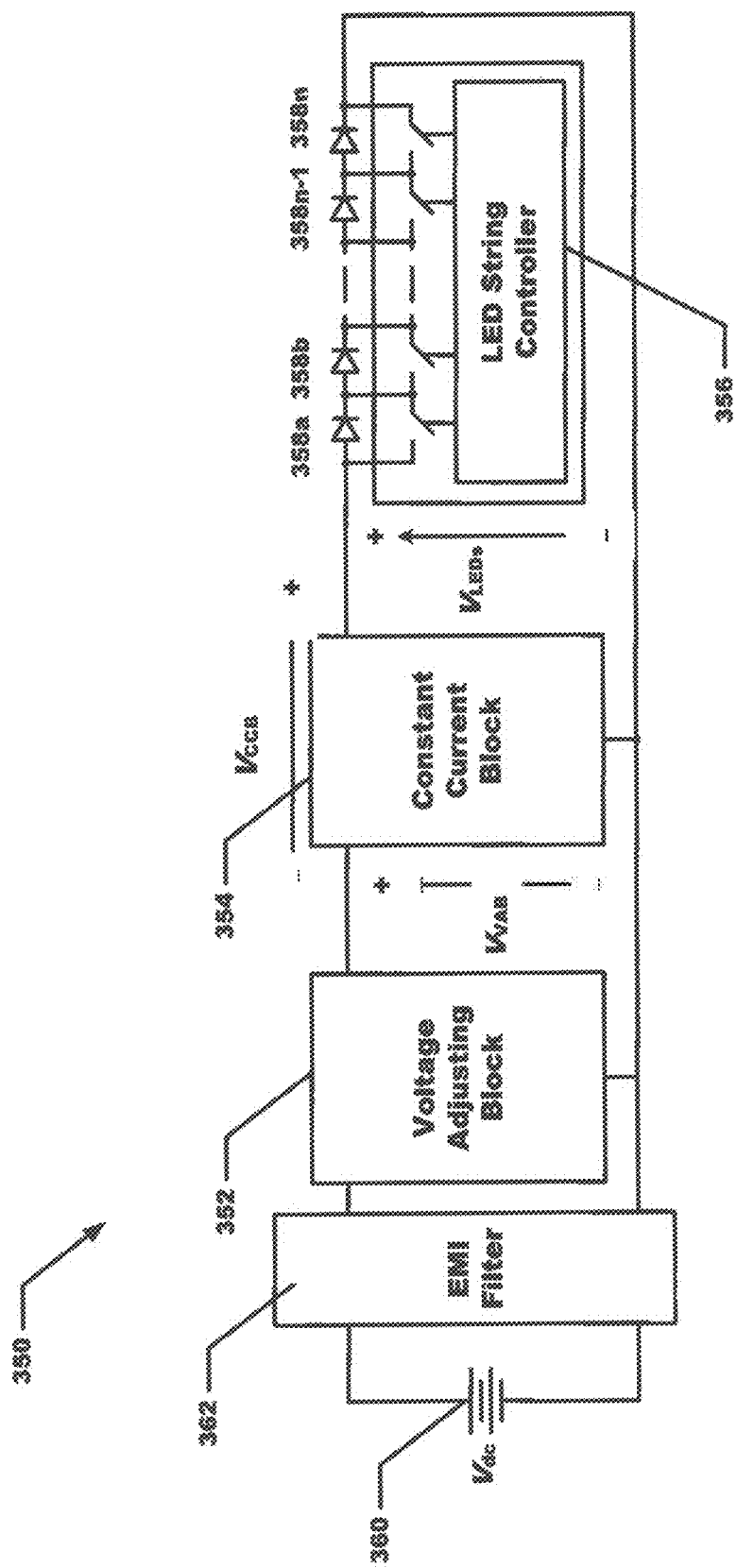
FIG. 7 depicts a block diagram of another view of the adjustable voltage constant current LED driver circuit in accordance with various embodiments.
Figure 8:
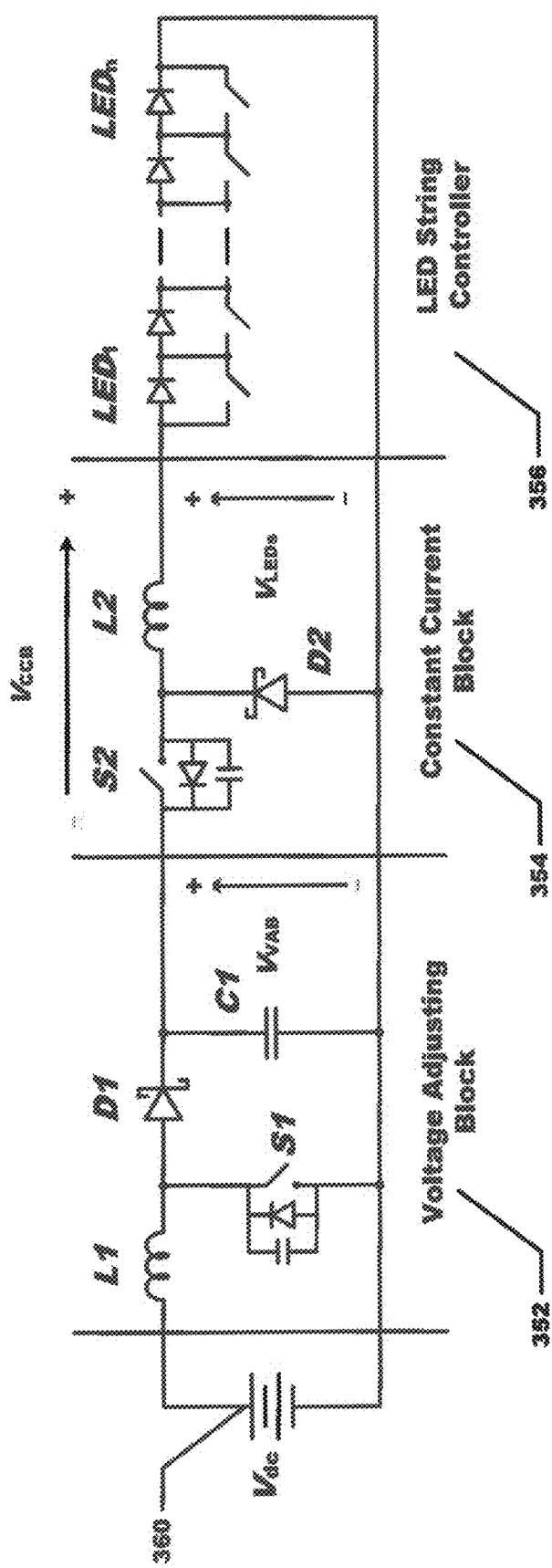
FIG. 8 depicts a block diagram of another view of the adjustable voltage constant current LED driver circuit in accordance with various embodiments.
Figure 9:
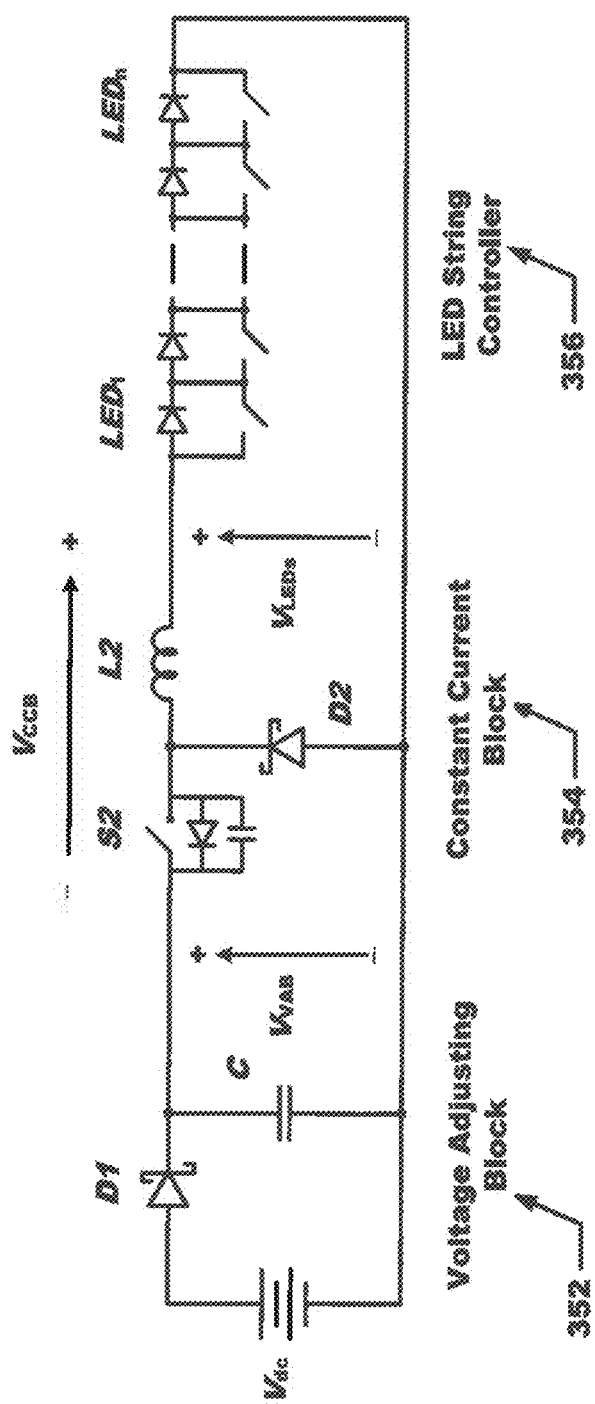
FIG. 9 depicts a block diagram of another view of the adjustable voltage constant current LED driver circuit in accordance with various embodiments.

Referring now to FIGS. 6-9, a block diagram of the second embodiment of an adjustable voltage constant current LED driver circuit 300 is provided in FIG. 6. Similar to FIG. 1 there is a CCB 304 in series with a VAB 302 and LEDs 18a-18n and LED string controller 306. FIGS. 7-9 show a more detailed circuit 350 of the circuit 300 of FIG. 6.

Referring now in particular to FIGS. 8 and 9, a Voltage Adjusting Block (VAB) 352 is shown. The VAB 352 includes a first switch (S1) having a first lead and a second lead, the first switch S1 having a controllable duty cycle. The VAB 352 also includes a first diode (D1) having a cathode, and having an anode connected to a first lead of the first switch S1. Also included is a first inductor (L1) having a first lead connected to the anode of the first diode D1, and having a second lead. The VAB 352 further includes a first capacitor (C1) having a first lead connected to the cathode of the first diode D1 and having a second lead connected to the second lead of the first switch S1. The VAB 352 provides a variable voltage dependent upon a number of LEDs being turned on.

The circuit 350 further includes a constant current block (CCB) 354 having a first input connected to the cathode of the first diode D1, a second input connected to the second lead of the first capacitor C1, and an output. The circuit 350 also includes an LED string controller 356 having an input connected to the output of the CCB 354 and an output connected to the anode of a second diode (D2) of the CCB 354. The circuit 350 further includes a battery 360 having a first lead connected to second lead of the first inductor L1, and a second lead connected to the second lead of the first switch S1. The circuit 350 may also include an EMI filter 362 having a first connection to the first lead of the battery 360 and having a second connection to the second lead of the battery 360.

The duty cycle of the first switch S1 may be controlled by a first switch diode having a cathode connected to the first lead of the first switch S1 and having an anode connected to the second lead of the first switch S1, and a first switch capacitor having a first lead connected to the first lead of the first switch S1 and having a second lead connected to the second lead of the first switch S1.

The LED string in the LED string controller 356 may include a plurality of LEDs connected in series, in which an anode of the first LED of the plurality of LEDs is connected to the second lead of a second inductor (L2) of the CCB 354 and in which a cathode of a last LED of the plurality of LEDS is connected to the second lead of the battery 360. The LED string controller 356 also includes a plurality of bypass switches, in which each LED of the plurality of LEDS has a single bypass switch connected across the LED. The LED string controller 356 also includes a controller having an input and a plurality of outputs, in which each bypass switch of the plurality of bypass switches is controlled by an output of the controller.

The LED string controller 356 includes, for each bypass switch of the plurality of bypass switches, a switch diode having a cathode connected to the first lead of the bypass switch and having an anode connected to a second lead of the bypass switch. Each bypass switch includes a switch capacitor having a first lead connected to the first lead of the bypass switch and having a second lead connected to a second lead of the bypass switch.

The CCB 354 includes a second switch (S2) having a first lead connected to the cathode of the first diode D1, and having a second lead. The CCB 354 also includes a second diode (D2) having a cathode connected to the second lead of the second switch S2, and having an anode connected to the second lead of the battery. Additionally, the CCB 354 includes a second inductor (L2) having a first lead connected to the cathode of the second diode D2, and having a second lead connected to the anode of the first LED the LED string.

Referring now to FIG. 7, the voltages satisfy the relation:

$$V_{CCB} = V_{VAB} - V_{LEDs} \qquad (5)$$

In some embodiments, the structure of the CCB 354 as illustrated in FIG. 8 may be identical to the CCB 54 illustrated in FIG. 3. The VAB 352 is now a boost converter which provides $V_{VAB}$ to the input of CCB 352.

The difference of the embodiment illustrated in FIGS. 6-9 is that the value of $V_{VAB}$ is not fixed at a voltage larger than the maximum voltage of the LED string. Rather, $V_{VAB}$ varies adaptively with the number of LEDs to keep $V_{CCB}$ approximately constant (e.g., close to 4V) in order to keep the efficiency of CCB 354 high. Again, due to the step-down structure of CCB 354, the condition of equation 2 should be satisfied in order for CCB 354 to operate as a current source.

When the LED string has few active LEDs, i.e. when $V_{dc} - 4V > V_{LEDs}$, switch S2 remains off. Inductor L2 becomes short circuited and provides a path for the DC component of LED current toward the ground level (negative of $V_{dc}$) via D2. FIG. 9 shows this condition.

For the case of FIG. 9 the voltages are:

$$V_{VAB} \cong -V_{dc} - V_{D2} \rightarrow V_{CCB} = V_{dc} - V_{D2} - V_{LEDs} \quad (6)$$

Thus the maximum value of $V_{CCB}$ can reach up to $V_{dc}-V_{D2}$ when all LEDs are bypassed. As the number of active LEDs in the string increases, the value of $V_{CCB}$ reduces which also improves the efficiency of CCB 354. With more active LEDs, the value of $V_{LEDs}$ rises and the condition in equation 2 may be violated. Therefore VAB 352 starts operating as a standard boost converter. The controller of the VAB 352 may adjust the value of $V_{VAB}$ such that $V_{CCB}$ is kept approximately constant (e.g., close to 4V). Switch S2 switches with a duty ratio $D_{S2}$ and therefore:

$$V_{VAB} \cong \frac{1}{1-D_{S2}} V_{dc} \quad (7)$$

With this approach there is no longer a need to boost the battery voltage and keep it at 50V to cover the entire voltage range conditions of the LED string as there is no need to generate a constant voltage higher than the largest LED string voltage. Capacitor C1 has a small value so the settling time of $V_{VAB}$ Can be as short as 10 µs. Having $V_{CCB} \cong 4V$ results in a switching frequency of the CCB 354 having a narrower range of variation, which reduces the difficulty of EMI, stress on the gate drivers, and switching loss in S1.

Similarly, there is no need to synchronize the two converters. The CCB 354 operates with variable frequency to act as a current source, while VAB 352 may be a constant frequency converter. With proper design it is possible to keep the two frequency ranges close and reduce the size of EMI filter 362.

Figure 10:
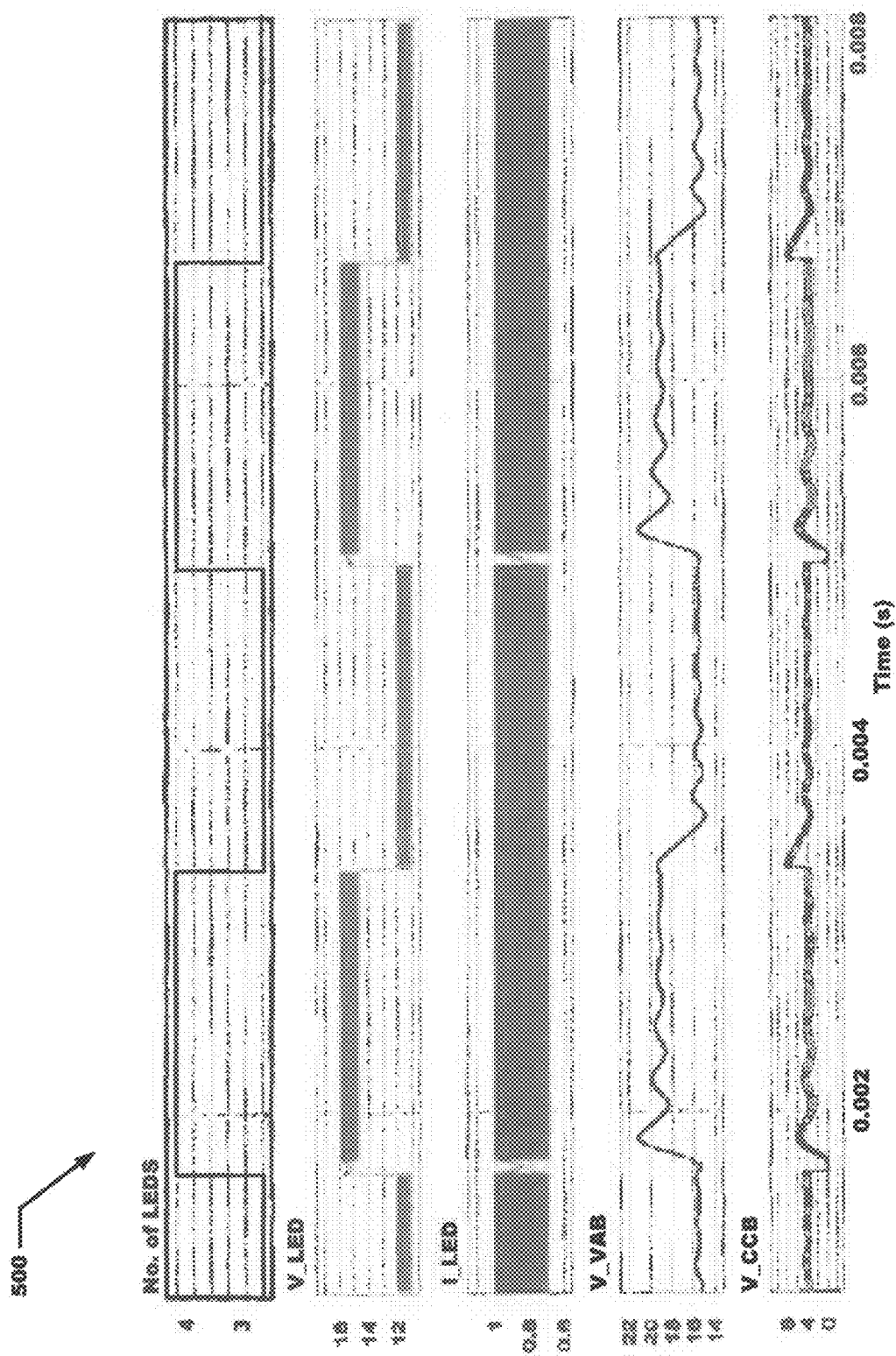
FIG. 10 depicts a graph showing various voltages and currents for the circuit of FIG. 9.

FIG. 10 shows the simulated main waveforms 500 for the converter $L_1=L_2=33$ µH and $C=22$ µF at $V_{dc}=12V$. The CCB 354 operates using a hysteresis controller to keep the LED current (I_LED) between 0.7 and 1 A. The VAB 352 operates at 200 kHz and its duty cycle, $D_{S2}$ changes (in an open loop feedforward fashion) such that $V_{CCB}$ is maintained at approximately 4V for any number of active LEDs. With respect to FIG. 10, the LEDs have a threshold forward voltage of 3V and a dynamic resistance of 1Ω. Therefore $V_{LED}$ varies from 11.55V to 15.4V when the number of active LEDs changes from 3 to 4, respectively. Note that usually there is no need to consider the transitions with more than one LED because it is possible to select the transition times of the PWM dimming to limit the transitions to one LED at a time. Also note that there is no overshoot and undershoot in the LED currents, and the LED voltage jumps to the needed value rapidly. The transients in the capacitor voltage are less than one volt, which may be acceptable.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described various embodiments it will now become apparent to those of ordinary skill in the art that other embodiments incorporating these concepts may be used.

What is claimed is:

1. A circuit comprising:
    a voltage adjusting block (VAB) coupled to a light emitting diode (LED) string, comprising:
        a first switch having a first lead connected to a voltage input, and having a second lead, the first switch having a controllable duty cycle;
        a first diode having a cathode connected to the second lead of the first switch, and having an anode;
        a first inductor having a first lead connected to the cathode of the first diode, and having a second lead; and
        a first capacitor having a first lead connected to the anode of the first diode and having a second lead connected to the second lead of the first inductor; and
    wherein the VAB provides a variable voltage across the anode of the first diode and the second lead of the first capacitor dependent upon a number of LEDs in the LED string being turned on;
    a LED string controller having a first input connected to the anode of the first diode, having a second input, and having a plurality of outputs controlling operation of the LED string;
    a constant current block (CCB) having a first input, having a second input connected to the second lead of the first capacitor and having an output connected to the second input of the LED string controller; and
    a battery having a first lead connected to the input of the CCB, and having a second lead connected to the second input of the CCB.

2. The circuit of claim 1, further comprising an electromagnetic interference (EMI) filter having a first connection to the first lead of the battery and having a second connection to the second lead of the battery.

3. The circuit of claim 1, wherein:
    the LED string comprises a plurality of LEDs connected in series;
    an anode of a first LED of the plurality of LEDs is connected to the second input of the LED string controller;
    a cathode of a last LED of the plurality of LEDs is connected to the first input of the LED string controller; and
    the LED string controller further comprises:
        a plurality of bypass switches, wherein each bypass switch is connected across one of the plurality of LEDs; and
        a controller having an input and a plurality of outputs, wherein each bypass switch of the plurality of bypass switches is controlled by an output of the plurality of outputs of the controller.

4. The circuit of claim 3, wherein a first bypass switch in the plurality of bypass switches comprises:
    a switch diode having a cathode connected to a first lead of the first bypass switch and having an anode connected to a second lead of the first bypass switch; and
    a switch capacitor having a first lead connected to the first lead of the first bypass switch and having a second lead connected to a second lead of the first bypass switch.

5. The circuit of claim 1, wherein the CCB comprises:
a second switch having a first lead connected to the first lead of the battery, and having a second lead;
a second diode having a cathode connected to the second lead of the second switch, and having an anode connected to the second lead of the battery; and
a second inductor having a first lead connected to the cathode of the second diode, and having a second lead connected to the second input of the LED string controller.

6. The circuit of claim 5, further comprising:
a second switch diode having a cathode connected to the first lead of the second switch and having an anode connected to the second lead of the second switch; and
a second switch capacitor having a first lead connected to the first lead of the second switch and having a second lead connected to the second lead of the second switch.

7. The circuit of claim 1, wherein the VAB further comprises a controller that is configured to adaptively adjust a voltage output of the VAB by altering a duty ratio of the first switch such that an voltage output of the CCB is kept approximately constant.

8. The circuit of claim 1, further comprising:
a first switch diode having a cathode connected to the first lead of the first switch and having an anode connected to the second lead of the first switch; and
a first switch capacitor having a first lead connected to the first lead of the first switch and having a second lead connected to the second lead of the first switch.

9. A circuit comprising:
a voltage adjusting block (VAB) coupled to a light emitting diode (LED) string, comprising:
a first switch having a first lead connected to a voltage input, and having a second lead, the first switch having a controllable duty cycle;
a first diode having a cathode connected to the second lead of the first switch, and having an anode;
a first inductor having a first lead connected to the cathode of the first diode, and having a second lead; and
a first capacitor having a first lead connected to the anode of the first diode and having a second lead connected to the second lead of the first inductor; and
wherein the VAB provides a variable voltage across the anode of the first diode and the second lead of the first capacitor dependent upon a number of LEDs in the LED string being turned on, and the LEDs in the LED string are turned on one at a time.

10. A circuit comprising:
a voltage adjusting block (VAB) coupled to a light emitting diode (LED) string, comprising:
a first switch having a first lead and a second lead, the first switch having a controllable duty cycle;
a first diode having a cathode, and having an anode connected to the first lead of first switch;
a first inductor having a first lead connected to the anode of the first diode, and having a second lead connected to an input voltage; and
a first capacitor having a first lead connected to the cathode of the first diode and having a second lead connected to the second lead of the first switch;
wherein the VAB provides a variable voltage across the first capacitor dependent upon a number of LEDs in the LED string being turned on;
a constant current block (CCB) having a first input connected to the cathode of the first diode, having a second input connected to the second lead of the first capacitor and having an output;
an LED string controller having an input connected to the output of the CCB and having an output connected to the second lead of the first switch; and
a battery having a first lead connected to the second lead of the first inductor, and a second lead connected to the second lead of the first switch.

11. The circuit of claim 10, further comprising an electromagnetic interference (EMI) filter having a first connection to the first lead of the battery and having a second connection to the second lead of the battery.

12. The circuit of claim 10, wherein:
the LED string comprises a plurality of LEDs connected in series;
an anode of a first LED of the plurality of LEDs is connected to a second lead of a second inductor in the CCB;
a cathode of a last LED of the plurality of LEDs is connected to the second lead of the battery; and
the LED string controller comprises:
a plurality of bypass switches, wherein each bypass switch is connected across one of the plurality of LEDs; and
a controller having an input and a plurality of outputs, wherein each bypass switch of the plurality of bypass switches is controlled by an output of the plurality of outputs of the controller.

13. The circuit of claim 12, wherein a first bypass switch in the plurality of bypass switches comprises:
a switch diode having a cathode connected to a first lead of the first bypass switch and having an anode connected to a second lead of the first bypass switch; and
a switch capacitor having a first lead connected to the first lead of the first bypass switch and having a second lead connected to a second lead of the first bypass switch.

14. The circuit of claim 10, wherein the CCB comprises:
a second switch having a first lead connected to cathode of the first diode, and having a second lead;
a second diode having a cathode connected to the second lead of the second switch, and having an anode connected to the second lead of the battery; and
a second inductor having a first lead connected to the cathode of the second diode, and having a second lead connected to the anode of the first LED of the plurality of LEDs.

15. The circuit of claim 14, further comprising:
a second switch diode having a cathode connected to the first lead of the second switch and having an anode connected to the second lead of the second switch; and
a second switch capacitor having a first lead connected to the first lead of the second switch and having a second lead connected to the second lead of the second switch.

16. The circuit of claim 10, wherein the VAB further comprises a controller that is configured to adaptively adjust a voltage output of the VAB by altering a duty ratio of the first switch such that an voltage output of the CCB is kept approximately constant.

17. The circuit of claim 10, further comprising:
a first switch diode having a cathode connected to the first lead of the first switch and having an anode connected to the second lead of the first switch; and
a first switch capacitor having a first lead connected to the first lead of the first switch and having a second lead connected to the second lead of the first switch.

18. A circuit comprising:
a voltage adjusting block (VAB) coupled to a light emitting diode (LED) string, comprising:
- a first switch having a first lead and a second lead, the first switch having a controllable duty cycle;
- a first diode having a cathode, and having an anode connected to the first lead of first switch;
- a first inductor having a first lead connected to the anode of the first diode, and having a second lead connected to an input voltage; and
- a first capacitor having a first lead connected to the cathode of the first diode and having a second lead connected to the second lead of the first switch;

wherein the VAB provides a variable voltage across the first capacitor dependent upon a number of LEDs in the LED string being turned on and the LEDs in the LED string are turned on one at a time.

* * * * *